US008359065B2

(12) United States Patent
Grandhi et al.

(10) Patent No.: US 8,359,065 B2
(45) Date of Patent: *Jan. 22, 2013

(54) METHODS AND SYSTEMS FOR PROVIDING EFFICIENT OPERATION OF MULTIPLE MODES IN A WLAN SYSTEM

(75) Inventors: Sudheer A. Grandhi, Pleasanton, CA (US); Mohammed Sammour, Al Rabieh Amman (JO); Joseph S. Levy, Merrick, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 46 days.

This patent is subject to a terminal disclaimer.

(21) Appl. No.: 13/218,919

(22) Filed: Aug. 26, 2011

(65) Prior Publication Data

US 2011/0310807 A1 Dec. 22, 2011

Related U.S. Application Data

(63) Continuation of application No. 11/618,328, filed on Dec. 29, 2006, now Pat. No. 8,014,818.

(60) Provisional application No. 60/756,457, filed on Jan. 4, 2006, provisional application No. 60/796,176, filed on Apr. 29, 2006.

(51) Int. Cl.
*H04M 1/00* (2006.01)

(52) U.S. Cl. .................. 455/552.1; 455/502; 455/556.2; 455/450; 370/328; 370/338; 370/253; 370/468; 370/503

(58) Field of Classification Search ................ 455/41.1, 455/422.1, 552.1, 502, 434, 553.1, 556.2, 455/549, 450, 550.1, 561, 452.1–453; 370/229, 370/235, 252, 294, 328–330, 331, 336–338, 370/343, 347–350, 395.2–395.5, 395.52, 370/389, 443–463, 468, 503, 506
See application file for complete search history.

(56) References Cited

U.S. PATENT DOCUMENTS

| 2002/0061031 | A1 | 5/2002 | Sugar et al. |
| 2002/0154653 | A1* | 10/2002 | Benveniste ................... 370/447 |
| 2004/0233876 | A1* | 11/2004 | Nakashima et al. .......... 370/338 |
| 2004/0257996 | A1 | 12/2004 | Choi et al. |
| 2004/0258039 | A1 | 12/2004 | Stephens |
| 2005/0135307 | A1 | 6/2005 | Yang et al. |
| 2005/0135408 | A1* | 6/2005 | Han et al. ...................... 370/445 |

(Continued)

FOREIGN PATENT DOCUMENTS

| WO | 03/039026 | 5/2003 |
| WO | 03/088581 | 10/2003 |

(Continued)

OTHER PUBLICATIONS

Adrian Stephens, *IEEE P802.11 Wireless LANs, Joint Proposal: High Throughput Extension To The 802.11 Standard: MAC*, (Dec. 15, 2005).

(Continued)

*Primary Examiner* — Chuong A Ngo
(74) *Attorney, Agent, or Firm* — Volpe and Koenig, P.C.

(57) ABSTRACT

A method and apparatus that applies medium access control (MAC) transmission opportunity (TXOP) protection for multiple mode operation in a WLAN system. In particular, MAC mechanisms are defined to support multiple mode CTS frames, and multiple mode CF-End frames sent by the AP, each in a format appropriate for the corresponding mode which may also apply to a single mode. MAC mechanisms permit truncation of TXOP duration for releasing the unused portion of the TXOP when no further data for transmission is available. Release of unused protected TXOP is possible for both protected AP transmissions and STA transmissions.

22 Claims, 13 Drawing Sheets

400

| OCTETS | 1 | 1 | 1 | 1 | | | | |
|---|---|---|---|---|---|---|---|---|
| BITS: | | | | B0–B1 | B2 | B3 | B4 | B5–B7 |
| | ELEMENT ID | LENGTH (22) | CONTROL CHANNEL | EXTENSION CHANNEL OFFSET | RECOMMENDED TRANSMISSION WIDTH SET | RIFS MODE | CONTROLLED ACCESS ONLY | SERVICE INTERVAL GRANULARITY |

| | 2 | | | 2 | | | 16 | |
|---|---|---|---|---|---|---|---|---|
| B0–B1 | B2–B15 | B0–B6 | B7 | B8 | B9 | B10–B15 | | |
| OPERATING MODE | RESERVED | BASIC STBC MCS | DUAL STBC PROTECTION | SECONDARY BEACON | L–SIG PROTECTION ALLOWED | RESERVED | BASIC MCS SET | |

U.S. PATENT DOCUMENTS

| | | | |
|---|---|---|---|
| 2005/0157747 | A1 | 7/2005 | Yang et al. |
| 2005/0238016 | A1* | 10/2005 | Nishibayashi et al. ....... 370/389 |
| 2005/0239455 | A1 | 10/2005 | Stephens |
| 2006/0034219 | A1 | 2/2006 | Gu et al. |
| 2006/0050742 | A1 | 3/2006 | Grandhi et al. |
| 2007/0010237 | A1 | 1/2007 | Jones et al. |
| 2007/0115882 | A1* | 5/2007 | Wentink ........................ 370/329 |
| 2007/0133447 | A1 | 6/2007 | Wentink |
| 2008/0013496 | A1* | 1/2008 | Dalmases et al. ............. 370/336 |

FOREIGN PATENT DOCUMENTS

| | | |
|---|---|---|
| WO | 2004/107668 | 12/2004 |
| WO | 2005/046085 | 5/2005 |
| WO | 2005/076544 | 8/2005 |
| WO | 2005/109761 | 11/2005 |

OTHER PUBLICATIONS

Asyed Aon Mujtaba, *IEEE P802.11 Wireless LANs, TGn Sync Proposal Technical Specification*, IEEE 802.11-04/0889r6, (May 2005).

Coffey et al., *WWiSE IEEE 802.11n Proposal*, IEEE 802.11-05/0737r0, (Jul. 2005).

Enhanced Wireless Consortium, *HT MAC Specification*, V1.0, (Sep. 12, 2005).

IEEE, *IEEE P802.11n/D0.01 Draft Amendment To Standard [FOR] Information Technology-Telecommunications And Information Exchange Between Systems- Local And Metropolitan Networks-Specific Requirements- Part 11: Wireless LAN Medium Access Control (MAC) And Physical Layer (PHY) Specifications: Enhancements For Higher Throughput*, IEEE P802.11n/D0.01, (Jan. 2006).

IEEE, *IEEE P802.11n/D1.01 Draft Amendment To Standard For Information Technology-Telecommunications And Information Exchange Between Systems- Local And Metropolitan Area Networks- Specific Requirements- Part 11: Wireless LAN Medium Access Control (MAC) And Physical Layer (PHY) Specifications: Amendment <number>: Enhancements For Higher Throughput*, IEEE P802.11n/D1.01, (Jul. 2006).

IEEE, *IEEE P802.11n/D1.05 Draft Amendment To Standard For Information Technology—Telecommunications And Information Exchange Between Systems—Local And Metropolitan Area Networks—Specific Requirements—Part 11: Wireless LAN Medium Access Control (MAC) And Physical Layer (PHY) Specifications: Amendment <Number>: Enancements For Higher Throughput*, IEEE P802.11n/D1.05, (Oct. 2006).

IEEE, *IEEE Standard For Information Technology- Telecommunications And Information Exchange Between Systems- Local and Metropolitan Area Networks- Specific Requirements, Part 11: Wireless LAN Medium Access Control (MAC) And Physical Layer (PHY) Specifications, Amendment 8: Medium Access Control (MAC) Quality of Service Enhancements*, IEEE Std 802.11e-2005, (Nov. 11, 2005).

IEEE, *IEEE Standard for Information Technology- Telecommunications And Information Exchange Between Systems- Local And Metropolitan Area Networks- Specific Requirements, Part 11: Wireless Medium Access Control (MAC) And Physical Layer (PHY) Specifications: Amendment 7: Medium Access Control (MAC) Quality of Service (QoS) Enhancements*, IEEE P802.11e/D11.0, (Oct. 2004).

IEEE, *Information Technology- Telecommunications And Information Exchange Between Systems- Local And Metropolitan Area Networks- Specific Requirements- Part 11: Wireless LAN Medium Access Control (MAC) And Physical Layer (PHY) Specifications*, ANSI/IEEE Std 802.11, 1999 Edition (R2003), (Reaffirmed Jun. 12, 2003).

Kose et al., *IEEE P802.11 Wireless LANs, WWiSE Proposal: High Throughput Extension To The 802.11 Standard*, IEEE 802.11-05/0149r1, (Jan. 2005).

Stamoulis et al., *Impact of Space-Time Block Codes on 802.11 Network Throughput*, IEEE Transactions on Wireless Communications, vol. 2, No. 5 (Sep. 2003).

Sudheer Grandhi, *IEEE P802.11 Wireless LANs, Submission To Address Letter Ballot 84 Comment, General MAC*, IEEE 802.11-06/0354r1, (Mar. 2006).

Wikipedia.Org, IEEE 802.11e, (Last Modified Jul. 11, 2006), at http://en.wikipedia.org/wiki/IEEE_802.11e, (Last Visited Dec. 6, 2006).

* cited by examiner

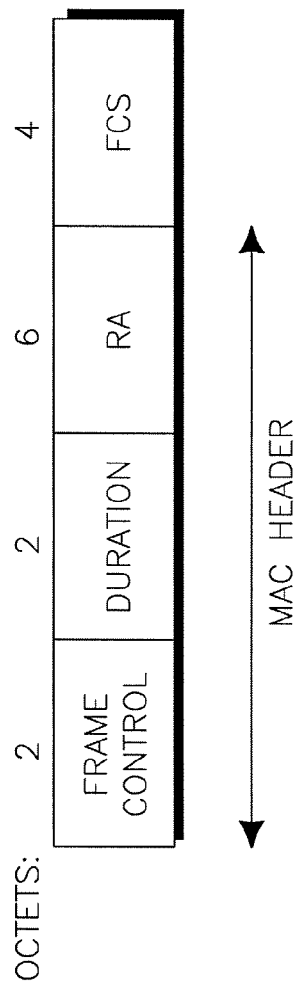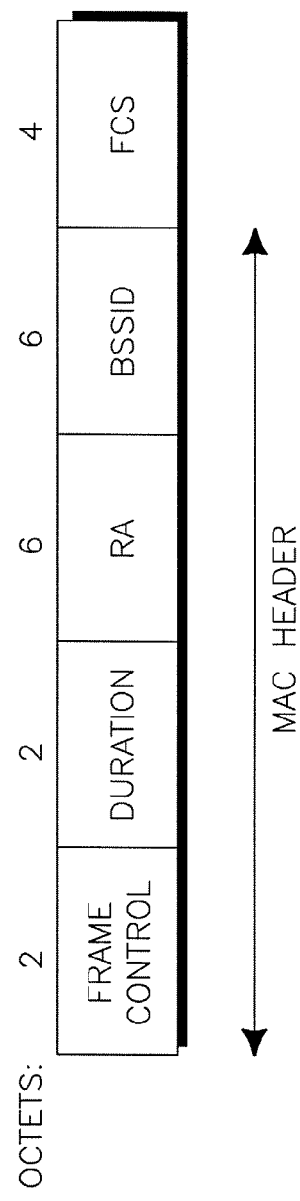

| OCTETS: | 1 | 1 | 1 | 1 | 1 | 2 | 2 | 16 |
|---|---|---|---|---|---|---|---|---|
| | ELEMENT ID | LENGTH (22) | CONTROL CHANNEL | | | | | |

| BITS: | B0-B1 | B2 | B3 | B4 | B5-B7 |
|---|---|---|---|---|---|
| | EXTENSION CHANNEL OFFSET | RECOMMENDED TRANSMISSION WIDTH SET | RIFS MODE | CONTROLLED ACCESS ONLY | SERVICE INTERVAL GRANULARITY |

| BITS: | B0-B6 | B7 | B8 | B9 | B10-B15 |
|---|---|---|---|---|---|
| | BASIC STBC MCS | DUAL STBC PROTECTION | SECONDARY BEACON | L-SIG PROTECTION ALLOWED | RESERVED |

| BITS: | B0-B1 | B2-B15 |
|---|---|---|
| | OPERATING MODE | RESERVED |

| BASIC MCS SET |
|---|

500

| BITS: | RESERVED | MORE PSMP | DESCRIPTOR END | STA INFO |
|---|---|---|---|---|
| | 6 | 1 | 9 | 64*M |

| BITS: | TIDS/TSIDS SET | STA ID | DLT START OFFSET | DLT DURATION | ULT START OFFSET | ULT DURATION |
|---|---|---|---|---|---|---|
| | 8 | 16 | 11 | 8 | 11 | 10 |

FIG.6

800
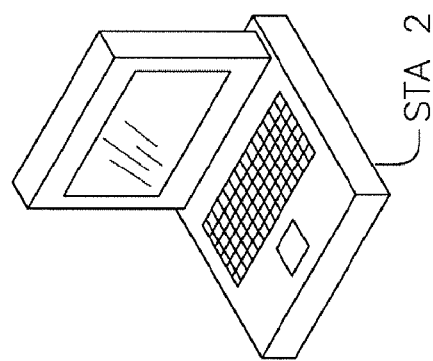
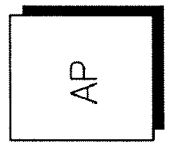
FIG.8
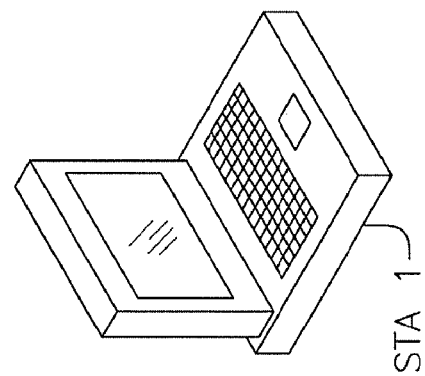

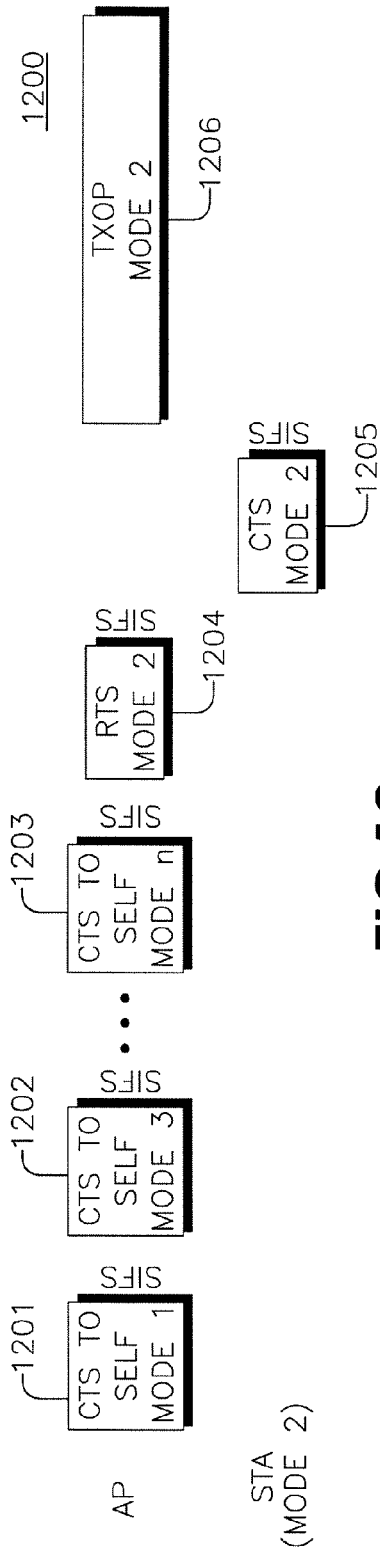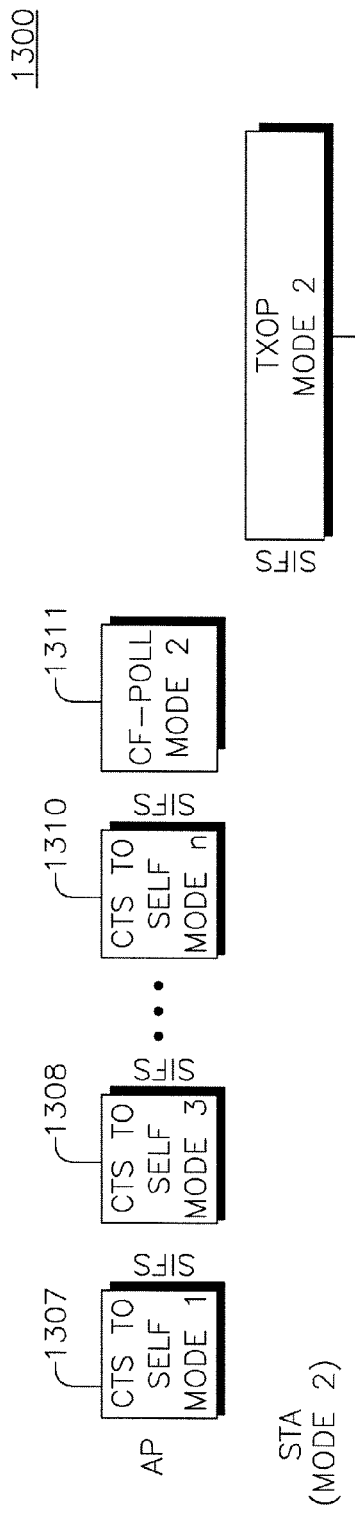

METHODS AND SYSTEMS FOR PROVIDING EFFICIENT OPERATION OF MULTIPLE MODES IN A WLAN SYSTEM

CROSS REFERENCE TO RELATED APPLICATIONS

This application is a continuation of U.S. patent application Ser. No. 11/618,328 filed on Dec. 29, 2006, which issued on Sep. 6, 2011 as U.S. Pat. No. 8,014,818, which claims the benefit of U.S. Provisional Application No. 60/756,457 filed on Jan. 4, 2006 and U.S. Provisional Application No. 60/796,176 filed on Apr. 29, 2006, the contents of which are hereby incorporated by reference.

FIELD OF INVENTION

The present invention generally relates to wireless local area networks (WLANs). More particularly it enhances operation of STAs in multiple mode deployment in the same coverage area.

BACKGROUND

Currently, various proposals are being presented and discussed for the 802.11n extension to the 802.11 WLAN standard, which will allow for higher throughput WLAN devices. These proposals come from various wireless consortiums that include EWC, the Joint Proposal and WWiSE. The following describes aspects of these proposals relevant to the present invention.

FIG. 1 shows a Clear to Send (CTS) frame as a MAC control frame as defined in the 802.11 standard. The receiver address (RA) of the CTS frame is copied from the transmitter address (TA) field of the immediately previous Request to Send (RTS) frame to which the CTS is a response. The duration value is the value obtained from the Duration field of the immediately previous RTS frame, minus the time, required to transmit the CTS frame and its short inter-frame spacing (SIFS) interval. If the calculated duration includes a fractional microsecond, that value is rounded up to the next higher integer.

The CTS frame need not always follow a RTS frame as described in the 802.11e standard (section 7.2.1.2). It can be the first frame in an exchange and used for setting the Network Allocation Vector (NAV) for MAC level protection for the transmission to follow. When the CTS frame is sent as the first frame by the initiating station of an exchange, the CTS may be addressed to itself and is referred to as CTS-to-self.

FIG. 2 shows a Contention Free End (CF-End) frame, which is a MAC control frame that may be sent by the AP as a broadcast frame to reset the NAVs of all stations in the system and is described in the 802.11 standard. A station receiving a CF-End frame with the basic service set ID (BSSID) of the BSS, to which the station is associated, will reset its NAV value to 0. This resets any medium protection/reservation currently existing. The Duration field is set to 0. As shown in FIG. 2, the BSSID is the address of the STA contained in the AP. The RA is the broadcast group address. The FCS is the frame check sequence.

In 802.11n, proposals were made to implement support for Extended Range using a different physical layer (PHY) modulation scheme than that used for Normal Range, essentially creating two modes of operation. Extended Range STAs transmit and receive using Space Time Block Code (STBC) PHY modulation, whereas Normal range STAs transmit and receive using a non-STBC PHY modulation. In a Joint Proposal contribution to 802.11n, an approach is described for an AP to support a network of STAs operating in a dual mode, where the two modes are Extended Range and Normal Range. Secondary beacon and Dual CTS method together are used to support Extended Range in addition to Normal Range, A secondary beacon is transmitted with a secondary beacon bit set in the beacon to let stations know that the target beacon transmission time (TBTT) for this beacon has an offset. In the Dual CTS protection, stations start a TXOP with an RTS directed at the AP, and the AP responds with a first and second CTS separated by a point control function inter-frame spacing (PIFS). When dual CTS protection enabled, the AP should protect STBC TXOPs with a non-STBC CTS and non-STBC TXOPs with an STBC CTS. The protection frames shall set a NAV for the entire TXOP. STBC control frames shall be used in response to STBC frames if the Dual CTS protection bit is set. Non-STBC control frames shall be used otherwise. PIFS is used as the interval to separate the dual CTS for non-STBC RTS.

FIG. 3 shows a diagram from the WWiSE proposal presentation document on the self-managed Extended Range protection. Examples of signaling for dual mode protection of normal range (NR) and extended range (ER) stations are shown. Signal sequences 301-305 relate to enhanced distributed coordination function (DCF) channel access (EDCA) and signal sequence 306 relates to a HCF controlled channel access (HCCA) format. The AP protects TXOP for the NR STA and ER STA using signal sequences 301-302 respectively. The ER STA protects its TXOP in signal sequence 303. A signal sequence for an 11n NR STA is represented by signal sequence 304, and one for a legacy NR STA is represented by signal sequence 305. In signal sequence 306, the AP protects a TXOP for the STA using HCCA format. As shown, the AP sends either a CTS in response to an RTS from a particular stations and in the mode as used by the station that sent the RTS, or a CTS-to-self signal in the mode other than that of the RTS-sending station.

FIG. 4 shows a new HT information element according to the WWiSE proposed Extended Range. The AP signals new HT information elements in management frames such as beacon, probe response etc. to manage the BSS (for example to support Extended Range). The new HT information elements may also be present in all beacons and probe responses transmitted by a station in IBSS mode. The HT information elements contain fields such as Secondary beacon, dual STBC/CTS protection, etc. as shown in FIG. 4. According to the Joint Proposal, the length is not fixed and the size depends on the number of fields that are included. The fields shall be in the order as shown in FIG. 4, with any new fields appearing at the end of the existing fields. Any fields unknown to the STA shall be ignored.

According to the Joint Proposal specification, and the EWC specification, following are some definitions related to Power Save Multi-Poll (PSMP) feature. A Power Save Multi-Poll (PSMP) is a MAC frame that provides time schedule to be used by the PSMP transmitter and PSMP receivers. The time schedule begins immediately subsequent to the transmission of the PSMP frame. A downlink transmission (DLT) is a period of time described by a PSMP frame, which is intended to be used for the reception of frames by PSMP receivers. An uplink transmission (ULT) is a period of time described by a PSMP frame, which is intended to be used for the transmission of frames by a PSMP receiver.

FIGS. 5 and 6 show PSMP information element formats according to the EWC MAC specification. FIG. 5 shows a PSMP parameter set format in which the PSMP is of type/subtype Management Action Frame and broadcast address type. The PSMP parameter set is used to describe the DLT and ULT which immediately follows the PSMP frame. FIG. 6 shows the STA Info information element format details such as Traffic (flow) ID, STA ID, DLT offset and duration, ULT offset and duration.

FIG. 7 shows the PSMP sequence consisting of a DLT phase followed by a ULT phase. Multi TID Block ACK (MTBA) is used to send Block ACK for multiple TID flows.

A need exists to extend a dual mode protection to supporting multiple mode operation. The current art is not robust and efficient in medium usage because it does not provide a mechanism to recover any unused transmission opportunity (TXOP) duration protected by the dual CTS transmission. Under the current art scheme, if the STA runs out of data to transmit during the protected TXOP, the medium is wasted for the remainder of the TXOP. A need exists to provide MAC signaling to relinquish the remaining unused TXOP to the system.

A need also exists for the PSMP sequence to operate in a multiple mode system in a bandwidth efficient manner. The 802.11n specification contains inconsistencies with respect to allowing only ACK/MTBA in ULT and no data for unscheduled PSMP. Also, there is no guidance for truncation of TXOP under dual CTS protection for STAs that are not able to interpret the CF-End frame.

SUMMARY

A first embodiment is a method and system for extending a specific (STBC and non-STBC) dual mode operation in a WLAN system to a more general multiple mode operation. A second embodiment is a method and system for enhancing the MAC protection mechanisms in multiple mode operation, in particular, mechanisms to support a multiple CF-End (each in a format appropriate for the corresponding mode) frame sequence sent by the AP to enable efficient medium utilization which may also apply to a single mode. A third embodiment is a method and system for enhancing PSMP sequences in multiple mode operation.

BRIEF DESCRIPTION OF THE DRAWINGS

A more detailed understanding of the invention may be had from the following description of a preferred embodiment, given by way of example and to be understood in conjunction with the accompanying drawings wherein:

FIG. 1 shows a CTS frame according to the 802.11 Standard;

FIG. 2 shows a CF-End frame format according to the 802.11 Standard;

FIG. 4 shows a management frame HT information element format;

FIG. 5 shows a PSMP parameter set format;

FIG. 6 shows a PSMP STA Info information element format;

FIG. 8 shows an exemplary wireless LAN operating in multiple mode;

FIG. 12 shows a frame transmission of an AP protecting TXOP using EDCA;

FIG. 13 shows a frame transmission of an AP protecting TXOP using HCCA;

DETAILED DESCRIPTION OF THE PREFERRED EMBODIMENTS

Figure 3:
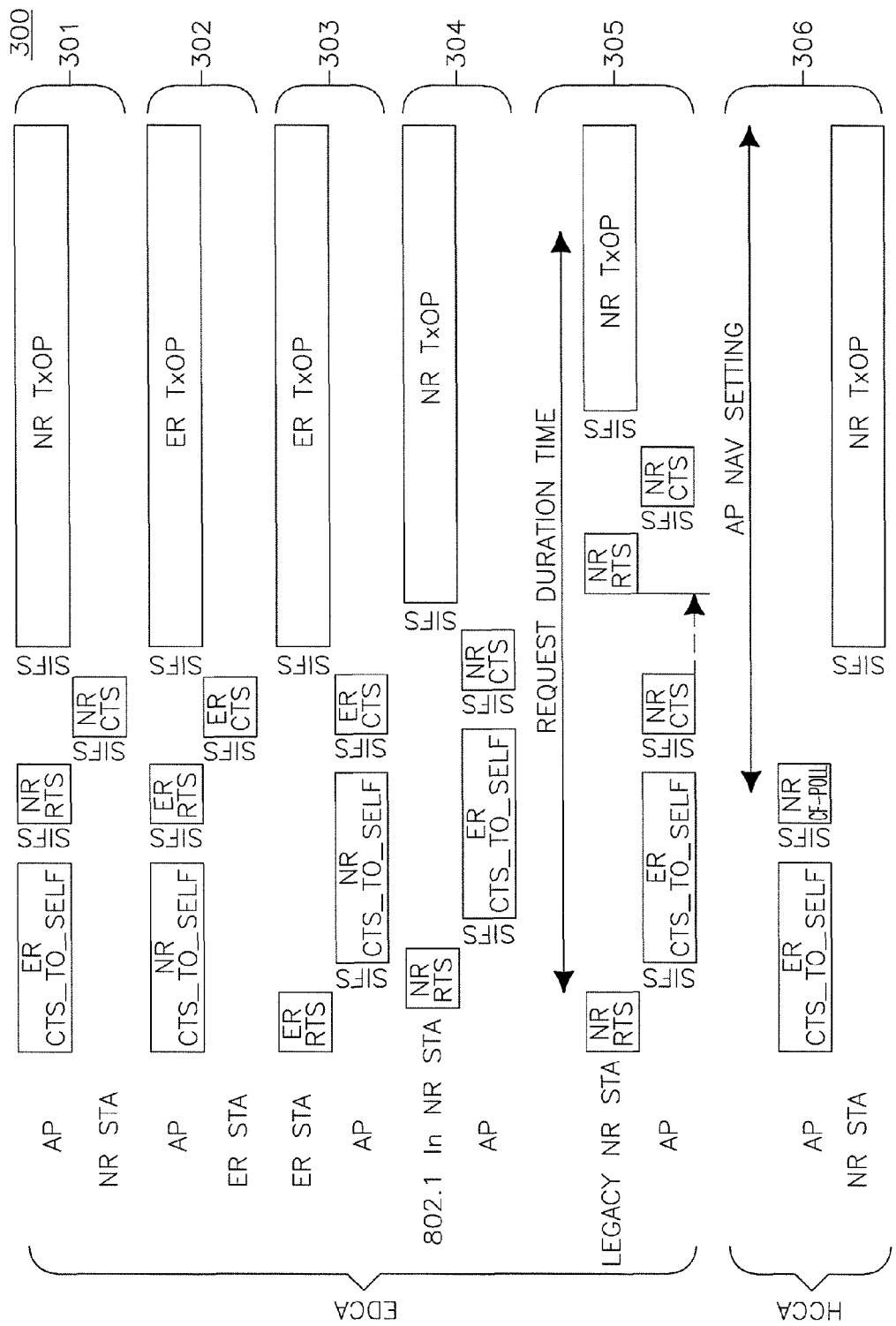
FIG. 3 shows a signaling diagram for self-managed extended range protection according to WWiSE.
Figure 7:
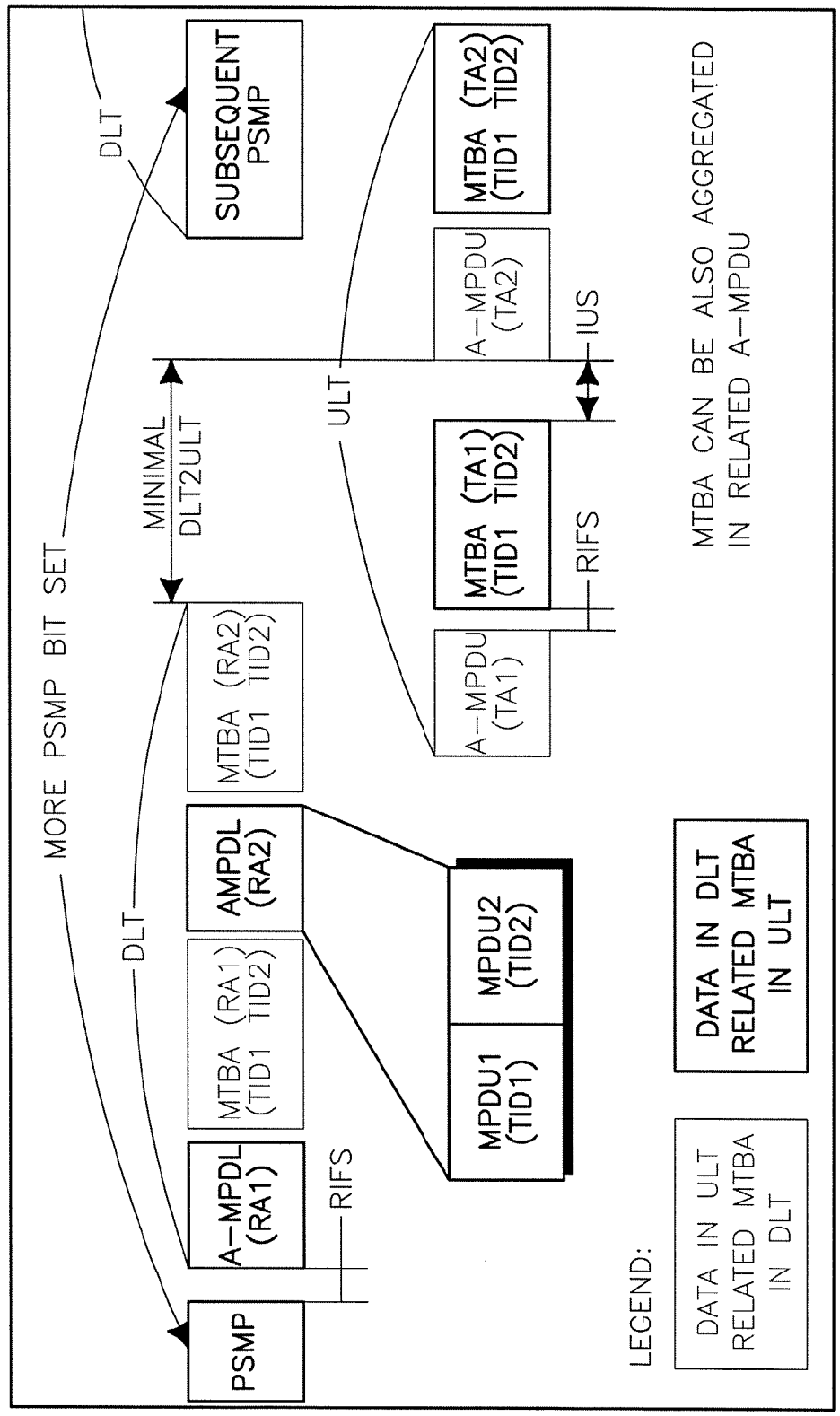
FIG. 7 shows the PSMP sequence consisting of a DLT phase followed by a ULT phase.

Hereafter, the terminology "station" or "STA" includes but is not limited to a wireless transmit/receive unit (WTRU), a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Hereafter for the purposes of describing the invention, "mode" is used to refer to the specific network link, below the MAC Layer, used for communication (transmission and reception) such as the PHY layer, channel interface, channel bandwidth (e.g., 20 MHz versus 40 MHz) and physical communication channel. It should be noted that STAs in different modes may not typically operate efficiently together in a BSS coverage area, unless controlled and protected by MAC layer mechanisms. The present invention relates to a multiple mode system (e.g., BSS) where STAs transmit and receive in multiple modes (more than one) in the same coverage area.

FIG. 8 shows an exemplary wireless LAN, comprising an AP, and a STA1 operating in a Mode 1 operation, and a STA2 operating in a Mode 2 operation. For simplicity, the preferred embodiments are described in the context of two modes, Mode 1 and Mode 2. However, the present invention may be extended to multiple mode operation that includes additional modes beyond two.

The following describes three preferred embodiments of the present invention. The first is a method and system for enhancing a specific (space time block coding (STBC) and non-STBC) dual mode operation in a WLAN system to a more general multi-mode operation. The second embodiment is a method and system for enhancing the MAC protection mechanisms in multiple mode operation, in particular, mechanisms to support a multiple CF-End (each in a format appropriate for the corresponding mode) frame sequence sent by the AP to enable efficient medium utilization which also applies to a single mode as a trivial case. The third embodiment describes a method and system for enhancing PSMP sequences in multiple mode operation.

The first embodiment concerns defining MAC mechanisms to support multiple mode operation. Examples of applications for multiple mode operation include: (1) legacy systems, (2) devices supporting a new modulation set, (3) devices which may be in a transition mode (new modulation set) before switching networks, (4) mesh networks supporting multiple modes, and (5) devices operating on more than one frequency band/channel.

In accordance with the first preferred embodiment, the AP supports multiple mode operation using two main MAC mechanisms: 1) by sending a beacon/secondary beacon followed by multicast/broadcast data for each mode supported; and 2) by supporting the sending of multiple CTS frames, each corresponding to one of the multiple modes that are supported. The challenge for the multiple mode protection is that the CTS protection frames must be interpreted in the mode format (modulation, link configuration, etc.) by each of the two communicating entities. Thus, if a STA is using a specific mode format, then the CTS protection frame must be sent and received in that specific format to allow recognition by the STA.

Figure 9:
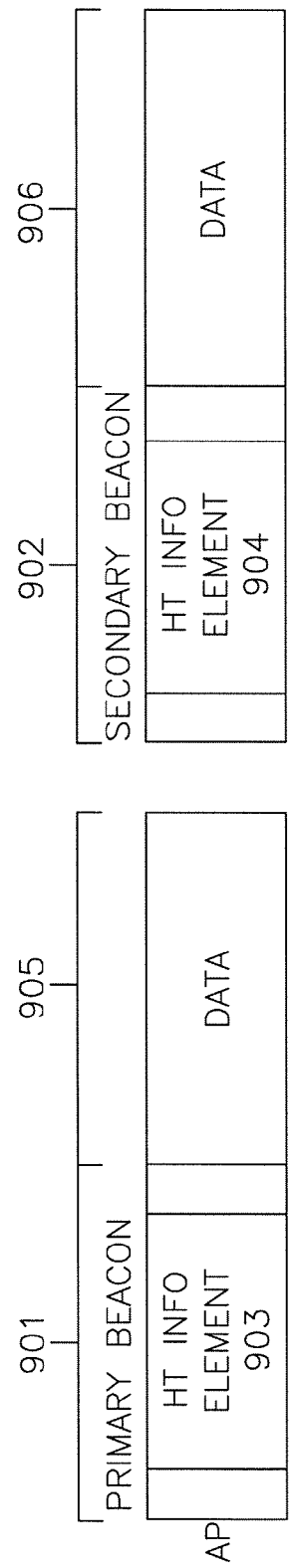
FIG. 9 shows a primary beacon format and a secondary beacon format that includes primary and secondary beacon ID fields.

FIG. 9 shows a diagram that is representative of a preferred set of frame formats according to the above MAC mechanisms of the AP. A primary mode frame comprises a primary beacon 901 followed by the multicast/broadcast data 905. The primary beacon includes an HT Information Element 903. After a defined offset period, a secondary mode frame is sent that includes a secondary beacon 902 with its HT Information Element 904, followed by multicast/broadcast data 906. With reference to FIG. 8, the primary beacon serves STA1 on mode 1 (non-STBC). The secondary beacon serves STA2 which uses mode 2 (STBC). While for the purpose of example, here, mode 1 and mode 2 have been aligned with primary beacon and secondary beacon respectively, alternatively, the primary beacon can serve mode 2 and the secondary beacon can serve mode 1, depending on system parameters. Returning to our example, generally, the primary beacon will serve all stations using mode 1, and the secondary beacon will service all stations using mode 2. For multiple mode operation, additional secondary beacons will serve each of the modes used in the system, respectively.

During the multiple mode operation, the AP sends a beacon/secondary beacon and multicast/broadcast traffic in a format suitable for each mode supported by the system. In a multiple mode system, one of the several beacons transmitted (corresponding to the several modes) is identified as the primary beacon 901. Each secondary beacon 902 may be transmitted with a time offset (with reference to the primary beacon 901 or any other time reference). The time offset may be determined based on system considerations. The time offset may be a configurable system parameter that could be changed dynamically by the AP. A timing synchronization function (TSF) timestamp of the secondary beacon 902 shall be the actual timestamp. All other fields in the secondary beacon 902 are preferably identical to the corresponding fields in the primary beacon 901. The multicast/broadcast data 906 transmitted after the secondary beacon 902 is preferably identical to the multicast/broadcast data 905 sent after the primary beacon 901. Based on system considerations, each secondary beacon 902 includes extra fields and data unique to its mode. Also based on system considerations, each mode may have extra multicast/broadcast fields and data unique to its mode.

Figure 10:
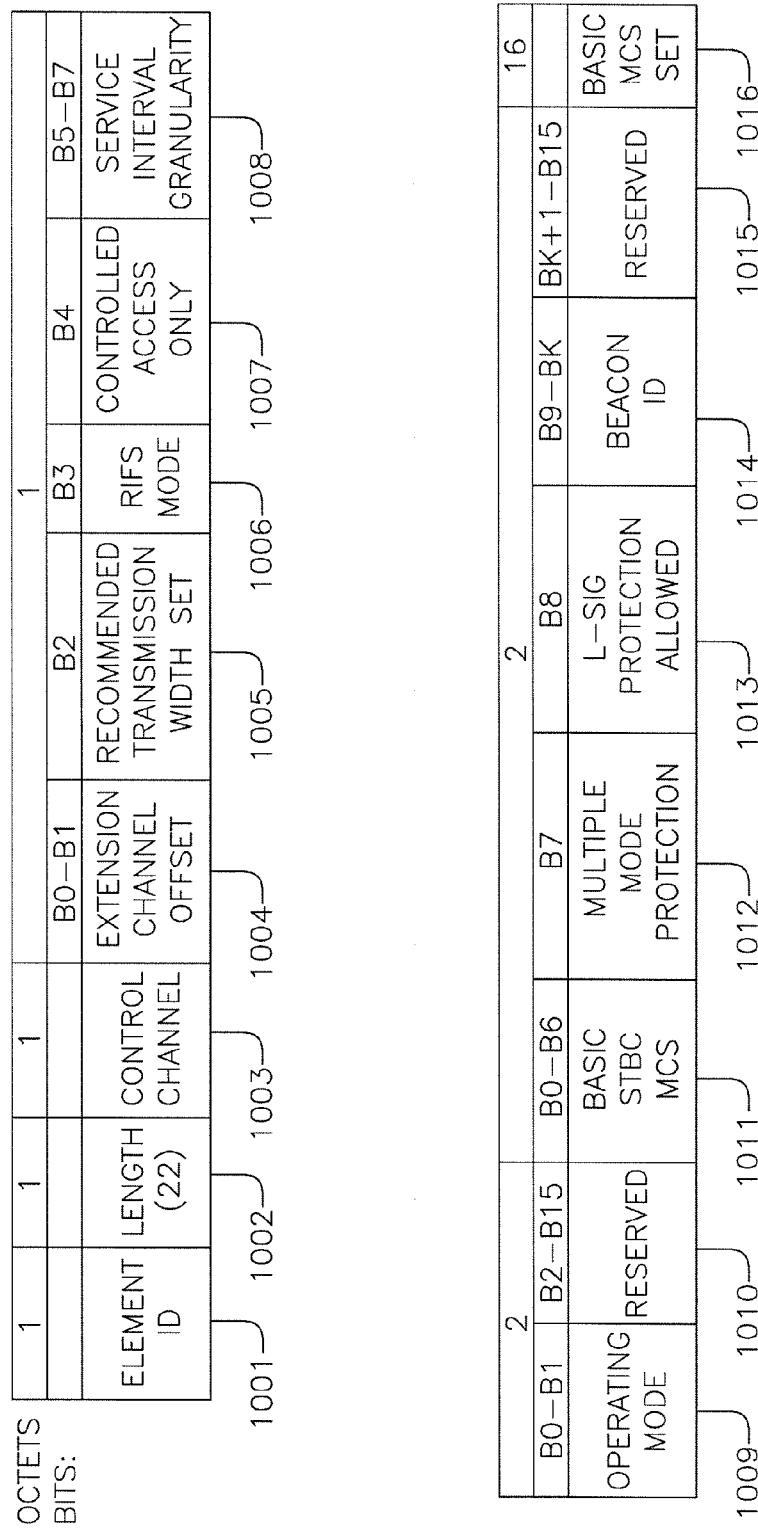
FIG. 10 shows a management frame HT information element format that includes primary and secondary beacon IDs.

FIG. 10 shows the preferred format for an HT Information element 1000, corresponding to HT information elements 903, 904. The HT Information element 1000 comprises the following fields: element ID 1001, length 1002, control channel ID 1003, extension channel offset 1004, recommended transmission width set 1005, RIFS mode 1006, controlled access only 1007, service interval granularity 1008, operating mode 1009, Basic STBC MCS 1011, L-SIG protection allowed 1013 and Basic MCS set 1016. These fields correspond with the proposed management HT information element format shown in FIG. 4. In accordance with the present invention, a multiple mode protection field 1012 and beacon ID field 1014 are included to support multiple mode. As an example for dual mode, the Beacon ID field 1014 may be one bit, where if the HT info element has a value of 0, it is primary beacon, and if the value equals 1, then it is a secondary beacon. For multiple mode, however, a single bit info element is extended to a size adequate for identification of all existing modes besides the primary mode. As shown in FIG. 10, the beacon ID field 1014 is tagged by bits B9-Bk where k is selected based on the number of supported modes. For example, in a system using 16 modes, a beacon ID field of 4 bits (B9-B12, k=12) is selected.

Figure 11:
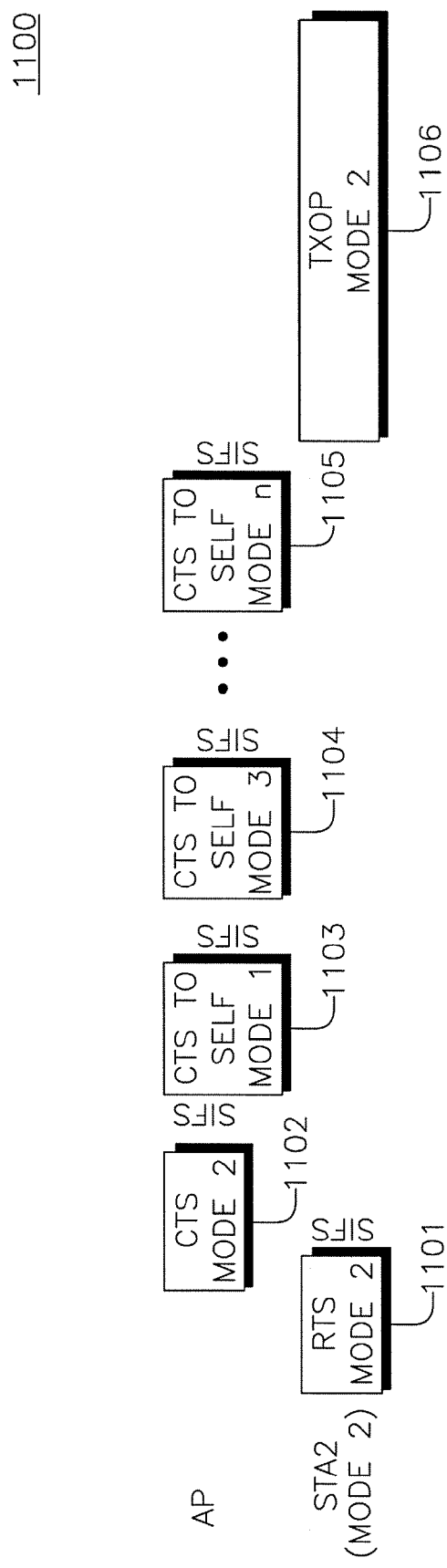
FIG. 11 shows a frame transmission of a STA using protecting TXOP for a specific mode format.

FIG. 11 shows an example signaling diagram 1100 for a multiple mode system using n modes that includes the AP and the station STA2, which is operating in Mode 2 and protecting a TXOP. An indication is provided by the AP that multiple mode TXOP protection is supported by the system. The preferred mechanism for this indication is for the AP to signal a multiple CTS protection field/bit in the new HT information element Multiple Mode Protection 1012 as shown in FIG. 10. When the multiple CTS protection field/bit is set by the AP and received by the station STA2, a TXOP is started by the station STA2 with a request to send (RTS) frame 1101 in Mode 2 is transmitted to the AP. The response from the AP is to send multiple CTS and CTS-to-self frames 1102-1105 in formats corresponding to the modes, for example, modulation, link configuration, etc., so that stations operating in the other modes will be notified that a TXOP has been reserved/protected for Mode 2 stations, such as STA2.

As shown in FIG. 11, the AP transmits a CTS frame 1102 in the mode being used for the TXOP being protected by the STA. Here, the STA is the station STA2 which initiated the TXOP is operating in Mode 2, and the position of the Mode 2 CTS frame 1102 in the multiple CTS frame response from the AP is first. Alternatively, the position for this mode's CTS frame may be last, or as determined by the system and based on priority assigned to modes. The AP also sends multiple CTS-to-Self frames 1103-1105 in all modes except in the mode being used for the TXOP being protected by the STA, i.e., CTS-to-Self Mode 1, CTS-to-Self Mode 3 . . . CTS-to-Self Mode n. The relative order of these CTS-to-Self frames can be arbitrary or determined based on system and implementation considerations and based on priority assigned to modes.

The multiple CTS/CTS-to-Self frames 1102-1105 are separated by a PIFS, SIFS (as shown) or other time duration, such as Reduced Inter Frame Spacing (RIFS), as determined based on other system factors. Once the multiple CTS/CTS-to-self frames 1102-1105 have been completely sent, the Mode 2 TXOP 1106 commences.

The multiple CTS/CTS-to-Self frames sent by the AP in response to the RTS frame applies to the following cases. Where a BSS with an AP is communicating in a multiple mode operation using multiple CTS signals, the response by each of the STAs is with a single CTS frame in the format corresponding to its mode of operation. Alternatively, each STA can be allowed to respond with multiple CTS frames, which is particularly useful in an independent basic service set (IBSS) (i.e., where there is no AP and all stations are peers) or a mesh scenario. In such a case, a selected STA plays the role of an AP by sending the multiple CTS frames. Otherwise, coordinating the CTS response from several stations could be difficult.

FIG. 12 shows an example signaling diagram 1200 of the AP protecting a Mode 2 TXOP using EDCA, which corresponds to the dual protection signal sequence 301 of FIG. 3. Here, the AP initiates a Mode 2 TXOP for itself, beginning with multiple CTS-to-self frames 1201-1203 in all modes except for Mode 2. Again, as in FIG. 11, the sequence of the multiple mode CTS-to-self frames may be arbitrary or determined based on system and implementation considerations and based on priority assigned to modes. Next, the AP sends a Mode 2 RTS frame 1204, which contains specific STA address information, addressed particularly to STA2 for this example. In response, STA2 sends a Mode 2 CTS frame 1205, which allows the Mode 2 TXOP frame 1206 from the AP to commence, where AP transmits data in Mode 2.

FIG. 13 shows an example signaling diagram 1300 of the AP protecting a TXOP for a Mode 2 STA using HCCA, which corresponds to the dual protection signal sequence 306 of FIG. 3. When the multiple CTS protection field/bit 1012 is set and sent by the AP, the AP protects a TXOP in a given mode with multiple CTS-to-self frames 1307-1310 sent in formats corresponding to the modes, e.g., modulation, link configuration, etc., except in the mode being used for the TXOP being protected by the AP, which is Mode 2 in this example. The order of the multiple CTS-to-Self frames 1307-1310 corresponding to the multiple modes may be arbitrary or determined based on system and implementation considerations and based on priority assigned to modes. The multiple CTS-to-Self frames 1307-1310 may be separated by SIFS (as shown), PIFS or other time duration, such as RIFS, as determined based on other system factors.

As shown in FIG. 13 the multiple CTS-to-self frames 1307-1310 are followed by a CF-poll frame 1311 according to HCCA protocol, sent in the mode being used for the TXOP, after a SIFS, PIFS or other time duration such as RIFS, as determined based on other system factors. Here, the TXOP 1312 is for Mode 2, thus the CF-Poll frame 1311 is in Mode 2.

Under this multiple mode TXOP protection embodiment, where the TXOP for a STA is protected, the STA must wait before it starts its transmissions until the multiple CTS or CTS-to-Self frames from the AP are transmitted. To achieve this, the following preferable procedures are observed either individually or in various combinations. Preferably, the amount of time needed by the AP to transmit the multiple CTS/CTS-to-Self frames will be made known to the STAs in the system. An example of one possible approach is to include this information in a field of the new HT information element 1000 sent by the AP. Alternatively, a station will not start transmitting before it receives a CTS response to its RTS, and if such CTS response comes last, then no explicit time needs to be communicated beforehand. Another approach is to rely on carrier sensing before transmitting, i.e. even after receiving a CTS, the STA would have to wait if the medium is still occupied by CTS frames of other modes.

Alternatively, if all STAs are capable of transmitting and receiving on a single common mode format, even if they normally communicate in a specific mode, that common mode format is preferably used for sending protection control frames such as RTS and CTS. The modulation used for sending control frames is typically the basic rate in a given mode. The higher rates in each mode are used for data transmission. It is conceivable for a STA to support basic rates in all modes and higher rates only in one preferred/specific mode. In this case, a single RTS frame and single CTS frame being exchanged between two communicating devices in that common format is sufficient to establish protection in multiple mode system operation.

In all of the above protection mechanisms for multiple mode operation, the protection frames that are used (i.e., RTS, CTS) preferably set a NAV for the entire TXOP being protected.

Figure 14:
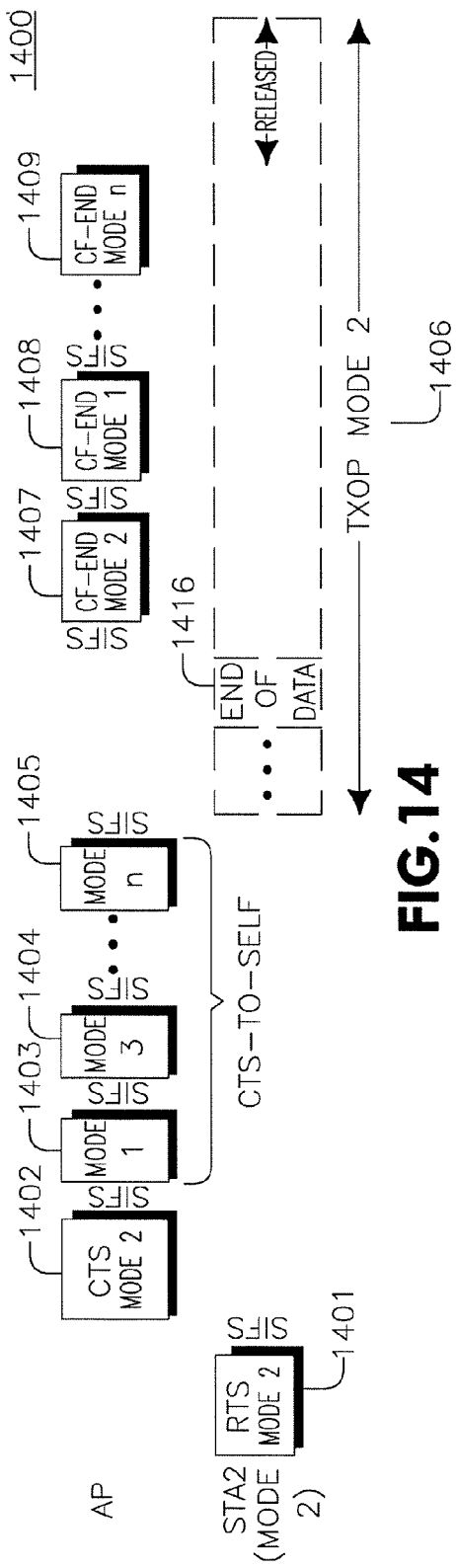
FIG. 14 shows a frame transmission sequence of an STA releasing unused TXOP.
Figure 15:
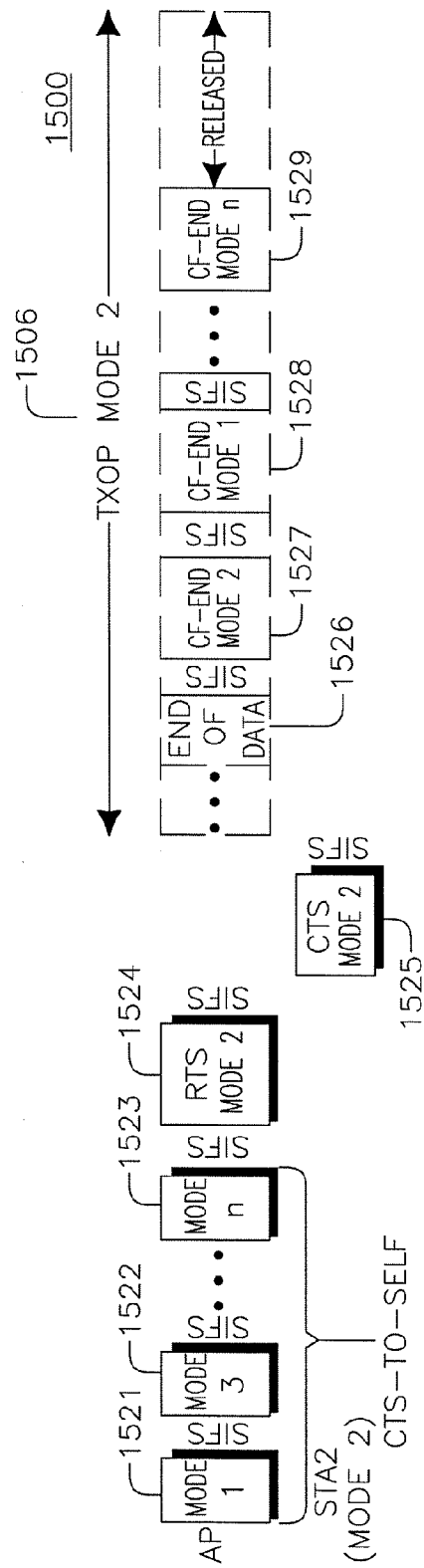
FIG. 15 shows a frame transmission sequence of an AP releasing unused TXOP using EDCA.
Figure 16:
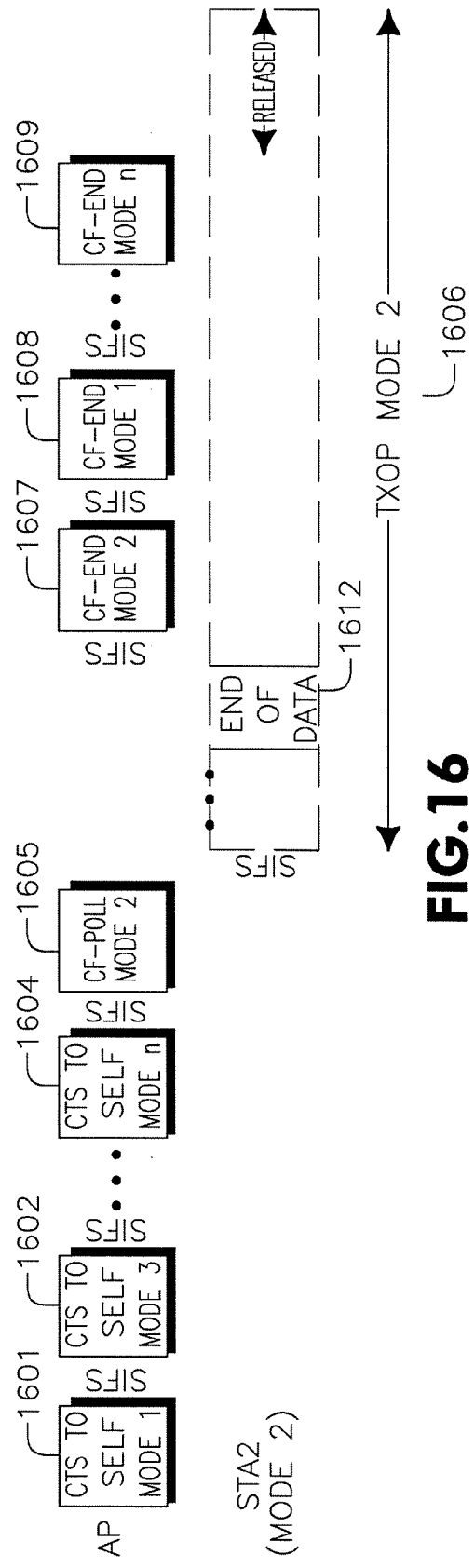
FIG. 16 shows a frame transmission sequence of an STA releasing unused TXOP using HCCA.

A second preferred embodiment of the present invention provides MAC mechanisms to support efficient usage of the medium in multiple mode operation by releasing unused portions of the protected TXOP. FIGS. 14-16 show examples signal sequences of how the multiple CF-End frame transmission may be used to release unused TXOP so as to enhance medium usage efficiency.

FIG. 14 shows an example of the STA releasing unused TXOP in Mode 2. As in the signal sequence shown in FIG. 11, the STA2 sends a Mode 2 RTS 1401, the AP responds with multiple CTS/CTS-to-self frames 1402-1405, and the STA2's TXOP commences in Mode 2. In this embodiment however, STA2 recognizes that no further data is available for transmission prior to the end of the TXOP frame 1406. STA2 then sends a single End of Data frame 1416, which can be in the format of a CF-End frame. The AP responds with multiple CF-End frames 1407-1409 in all modes. Once all CF-end frames are sent, the unused portion of the TXOP frame 1406 is released to the medium, and a new TXOP protection process can commence, initiated by another station or the AP for its own transmission on the medium.

FIG. 15 shows an example signal sequence of the AP releasing unused TXOP during EDCA in Mode 2 as an extension of the signal sequence shown in FIG. 12. The AP sends multiple mode CTS-to-self frames 1521-1523, followed by a mode 2 RTS frame 1524 to request a Mode 2 TXOP protection. STA2 responds with a Mode 2 CTS frame 1525, clearing the way for the AP to commence its TXOP frame 1506 in Mode 2. During the TXOP frame 1506, the AP recognizes that there is no more data to transmit, so it sends an End of Data frame 1526, which can be in the format of a CF-End frame. The AP then sends multiple CF-End frames 1527-1529 in all modes to notify all STAs that the AP has completed its Mode 2 transmission in the current TXOP frame 1506. The TXOP frame 1506 is then truncated and the unused remainder of the TXOP frame 1506 is then released for access to another STA or the AP in a different mode. Protection of the released TXOP follows the multiple mode procedures described above.

FIG. 16 shows an example signal sequence of the STA releasing unused TXOP during HCCA in Mode 2 as an extension of the signal sequence shown in FIG. 13. AP sends multiple CTS-to-self frames 1601-1604 in all modes except for the mode of the TXOP protection, which is Mode 2 in this example. The Mode 2 CF-Poll frame 1605 is sent and the Mode 2 TXOP frame 1606 for STA2 commences. During the TXOP frame 1606, STA2 recognizes that its transmission data has been depleted, so it sends the End of Data frame 1612. The AP notifies the other STAs in all modes using multiple CF-End frames in the respective modes. The TXOP remainder is then released.

As shown in FIGS. 14-16, the AP sequentially sends multiple CF-End frames within MAC protocol data units (MPDUs) with transmission formats (modulation, link configuration, etc.) corresponding to the modes supported by the AP. A time gap of SIFS (or other time duration as determined based on other system factors) is included between the CF-End frames.

The following are additional examples of conditional cases (individually or in combination), where this embodiment for releasing protected TXOP is applicable:

a. After receiving an End-of-Data MAC signal from the STA, as shown in FIG. 14, (or for example a QoS-NULL frame with an ACK response from AP) which started the TXOP;

b. After receiving an End-of-Data MAC signal from the STA (or for example a QoS-NULL frame with an ACK response from AP) which started the TXOP and the AP not having any data to send;
c. If the station which started the TXOP just stops sending data;
d. If the station which started the TXOP just stops sending data and the AP detects this by some means (such as Carrier Sensing) and the AP does not have any data to send;
e. After any medium recovery procedure; i.e. AP just recovered the medium, and can send CF-End frames to allow stations to access the medium;
f. If the AP initiated the TXOP and is done with downlink transmission and does not expect any uplink transmissions;
g. If the AP initiated the TXOP in EDCA and is done with downlink transmission and does not expect any further uplink transmissions (for example with an End-of-Data signal (as shown in FIG. 15), or a QoS-NULL frame with an ACK response from AP);
h. If the AP initiated the TXOP in HCCA with a CF-Poll and is done with downlink transmission and does not expect any uplink transmissions;
i. If the AP initiated the TXOP in HCCA with a CF-Poll and receives an End-of-Data MAC signal from the STA, as shown in FIG. 16, (or for example a QoS-NULL frame with an ACK response from AP) and the AP is done with downlink transmission.

The multiple CF-End frames that are sent by the AP preferably observe the following rules individually or in combination:
a. The multiple CF-End frames will be sent only if they can be sent before the current TXOP expires. This will be determined by the AP by estimating the remainder of the TXOP and comparing to the time required to send all CF-End frames;
b. If all the multiple CF-End frames cannot be sent before the current TXOP expires only as many as can be sent before the current TXOP expires will be sent;
c. In some cases or system conditions, even if all or some of the multiple CF-End frames cannot be sent before the current TXOP expires, they will all be still be sent even if some or all of them have to be sent outside the TXOP.

The multiple CF-End frames sent by the AP enable all other devices in the system to update their NAV and avoid potential waste or inefficiency in medium usage. The multiple CF-End frames from the AP are separated by SIFS or other time duration, such as RIFS, as determined based on other system factors. The mechanism and order of transmission of the multiple CF-End frames (including dual CF-End frames if in a dual mode system) sent by the AP to release unused TXOP may be as follows depending on the options desired:
a. The multiple CF-End frames may be transmitted in an order of priority as determined by the system configuration, which can also be dynamically changed, where the priority corresponds to that assigned to the modes supported by the system;
b. The first CF-End corresponds to the mode of the current TXOP and the rest of the CF-End frames correspond to the other modes;
c. The order of the multiple CF-End frames corresponding to the modes supported in the system may be arbitrary;
d. Just one CF-End frame in a format corresponding to the mode of the current TXOP is sent in which case the medium is opened up to all stations operating in that mode until the protection for that mode expires, which gives a preference to the stations operating in the mode of the TXOP;
e. If all stations can transmit and receive a single common mode format—even if they normally communicate in a specific mode—that common mode format should be used for sending one single CF-End frame which will be sufficient to update the NAV of all stations in all modes.

The following example is described with reference to a dual-mode system application, where dual CF-End frames are in the ER (Extended Range)/NR(Normal Range) functionality, and where one CF-End frame is sent in ER (STBC modulation), and the other CF-End frame is sent in NR (non-STBC modulation). The following describes one possible implementation of this dual CF-End frame example. If dual CTS protection is enabled (i.e., STBC & non-STBC CTS frames sent by the AP when dual CTS protection is enabled in the system, typically indicated in the beacon) and a STA obtains a TXOP and then the STA runs out of frames to transmit, then the STA may indicate "End of transmission" or "End of data" or "Truncation of its TXOP" by transmitting one of the following frames, provided that the remaining TXOP duration will allow it (i.e., that there is enough usable TXOP duration remaining after the CF-End frames for release):
Case 1: A CF-End frame with the modulation that the STA is using (STBC or non-STBC).
Case 2: A QoS-Null frame with the modulation that the STA is using (STBC or non-STBC).
Case 3: Any other type of MAC frame that indicates "end of transmission" or "end of data" signal—essentially indicating that the STA has no more frames to send.

With the transmission of any one of the above indication frames (the above Cases 1 to 3) the STA explicitly indicates the completion or truncation of its TXOP. When the transmitted frame is a CF-End frame (Case1) it shall be interpreted by the other STAs that are capable of receiving it as a NAV reset.

On receiving any one of the above mentioned frames (the above Cases 1 to 3) from a STA with a matching BSSID, an AP shall respond with dual CF-End frames—one STBC CF-End frame and one non-STBC CF-End frame—after a SIFS duration (or other time duration, such as RIFS, as determined based on other system factors). Another possibility is that, in Case 2 and any other frame that expects an ACK, the AP may first respond with an ACK before sending the dual CTS frames. Dual CF-End frames eliminate unfairness towards STAs that are not of the same mode as the one that owns the TXOP being truncated.

If the TXOP is owned by the AP and dual CTS Protection is enabled in the system (usually indicated in the beacon i.e when both STBC and non-STBC STAs are present in the system), the AP may send dual CF-End frames if it runs out of frames to transmit provided that the remaining TXOP duration will allow it.

Further, in general when dual CTS Protection is enabled in the system as indicated in the beacon (i.e., when both STBC and non-STBC STAs are present in the system), the AP shall send dual CF-End frames—one STBC CF-End frame and one non-STBC CF-End frame—to do a NAV reset. STAs that are capable of both modes may transmit dual CF-End frames when they want to truncate their TXOPs if the remaining TXOP duration will allow it.

The spacing between the dual CF-End frames sent by the AP shall be SIFS or other time duration, such as RIFS, as determined based on other system factors. The order of frames in the dual CF-End frames may be arbitrary or one of them may be chosen to be sent first. In a first possible embodiment, the first CF-End frame shall use the same modulation used for transmissions in the TXOP being truncated and the second CF-End frame shall use the other modulation. In other words, for a STBC TXOP the first CF-End is in STBC mode and for a non-STBC TXOP the first CF-End is in non-STBC mode.

Note that the solution above has both benefits of increased medium utilization efficiency and elimination of unfairness towards STAs that are not of the same mode as the one that owns the TXOP being truncated. This is because the CF-End sent by the owner of the TXOP to truncate the TXOP cannot be interpreted by the STAs of other modes and they will therefore not be able to access the medium until the AP sends the dual CF-End (or multiple CF-End in the general case). Also the above solution applies in general to the case of a system with several modes (more than two).

The following describes a particular embodiment according to the above Cases 1 to 3 that specifically applies to the 802.11n standards specification. If dual CTS protection is enabled and a STA obtains a TXOP and then the STA runs out of frames to transmit, the STA may then indicate truncation of its TXOP, by transmitting a CF-End frame provided that the remaining TXOP duration will allow it. For example, this condition may be determined according to the following determination: whether the remaining duration of the TXOP is greater than the sum of CF-End frame duration, a STBC CF-End frame duration, a non-STBC CF-End frame at a known basic rate, and two SIFS duration. With a CF-End frame transmission, the STA explicitly indicates the completion or truncation of its TXOP. The transmission of a CF-End frame shall be interpreted as a NAV reset by the other STAs that are capable of receiving it. On receiving a CF-End frame from a STA with a matching BSSID, an AP shall respond with dual CF-End frames after SIFS duration—one STBC CF-End frame and one non-STBC CF-End frame. If the TXOP is owned by the AP and dual CTS Protection is enabled in the system, the AP may send dual CF-End frames if it runs out of frames to transmit provided that the remaining TXOP duration will allow it. The spacing between the dual CF-End frames sent by the AP shall be SIFS. The first CF-End frame shall use the same modulation used for transmissions in the TXOP being truncated and the second CF-End frame shall use the other modulation. In other words, for a STBC TXOP the first CF-End is in STBC mode and for a non-STBC TXOP the first CF-End is in non-STBC mode.

The following describes another solution or mechanism which is simple in that there is no need to send a dual CF-End but is less efficient in medium utilization. When an STA or AP obtains a TXOP and uses the Long NAV mechanism to protect the TXOP duration, a CF-End frame is sent when there are no more frames to be sent indicating truncation or completion of TXOP. Our simplified solution is essentially to change the current rules for TXOP truncation under Long NAV protection by disallowing sending of a CF-End frame by the owner of the TXOP when dual CTS Protection is enabled in the system (preferably indicated in the beacon). So under these conditions, the TXOP will not be truncated by the owner even if it has no more frames to send. This also applies in general to the case of a system with several modes (more than two).

A STA, on receiving the CF End frame (or MPDU) with a modulation corresponding to its mode, can update its NAV (e.g., reset its NAV to 0) as follows:
  a. The station updates its NAV after verifying that the BSSID corresponds to its BSS (i.e. the BSS controlled by the AP with which the STA is associated). If the BSSID does not match, the STA does not update its NAV.
  b. In some cases or implementations, the STA updates its NAV regardless of the BSSID in the CF-End frame.

A third preferred embodiment of the invention defines a multiple mode PSMP sequence for a multiple mode system. The PSMP sequence of prior art is designed to operate for a single mode. So to apply the prior art PSMP sequence in a multiple mode system, each mode would begin with dual CTS-to-Self frames followed by a PSMP frame and the scheduled downlink and uplink transmissions. This procedure would have to be repeated for each mode using the prior art PSMP sequence. This is not efficient usage of the medium and not flexible since multiple mode allocations cannot be made in a single PSMP sequence.

Figure 17:
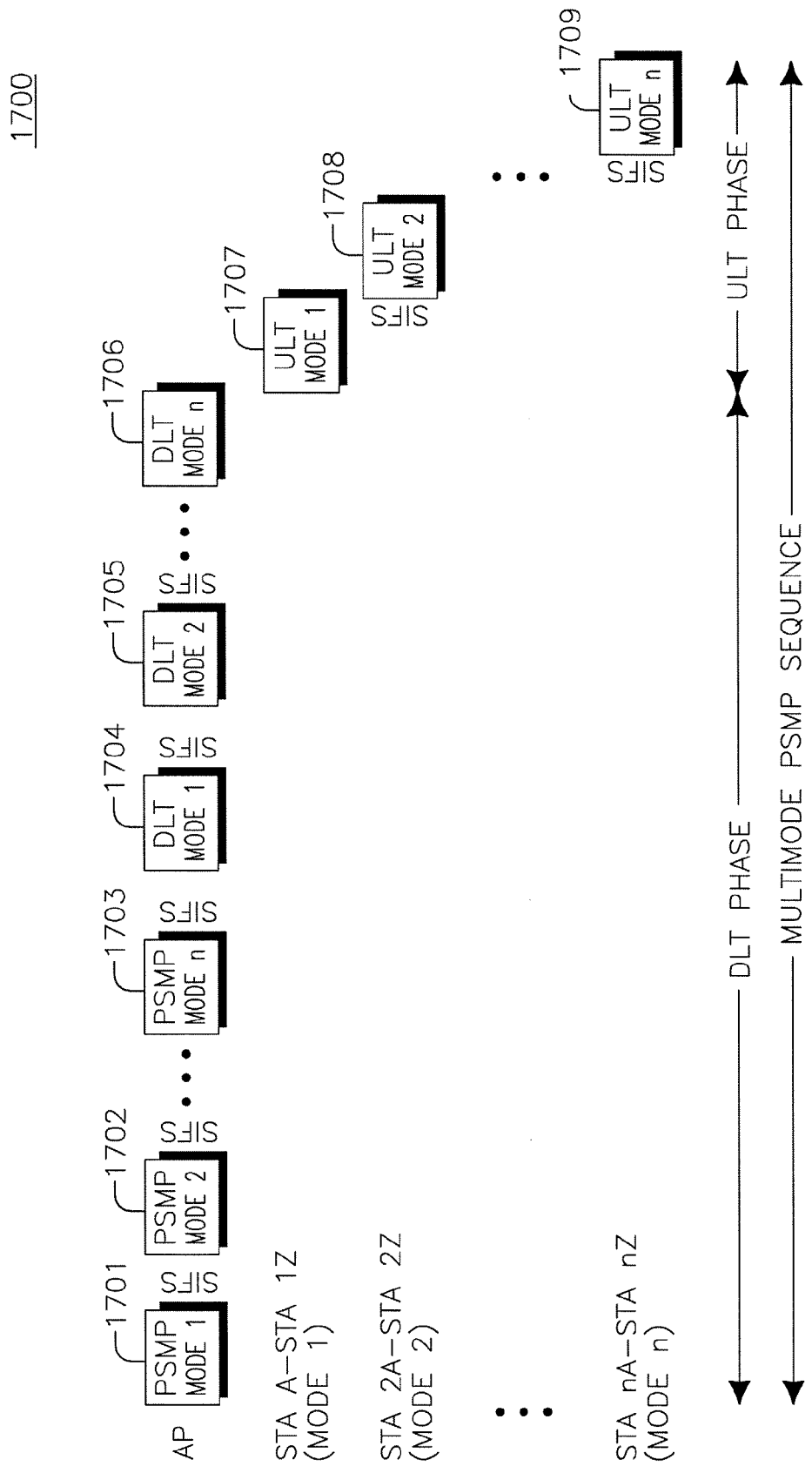
FIG. 17 shows a multiple mode PSMP frame sequence.

FIG. 17 shows an example of the multiple mode PSMP sequence according to the present invention. Here, the multiple mode PSMP sequence is defined as multiple mode CTS-to-self frames, followed by multiple mode PSMP frames, followed by the multiple mode downlink and uplink transmissions. Multiple mode PSMP frames define the schedule for the multiple mode downlink and uplink transmissions for the multiple mode PSMP sequence duration. The multiple mode PSMP frames may define downlink time (DLT) allocations and uplink time (ULT) allocations of the stations in various modes in any order as determined suitable for applications and capabilities of the devices and is completely flexible. Examples of the allocation ordering include, but are not limited to the following:
  (1) all the downlink allocations of the same mode may be lumped together—for example, there could be multiple STAs receiving in the same mode and one STA in each DLT;
  (2) all the uplink allocations of the same mode may be lumped together;
  (3) all uplink allocations are made after all the downlink allocations (FIG. 17);
  (4) the order of the STAs in the downlink allocations may be preserved in the uplink allocations (FIG. 17).

Many other variants are possible on how the multiple mode PSMP frames may define downlink time (DLT) allocations and uplink time (ULT) allocations. For example, a DLT can be followed by a ULT of the same mode. In other words, according to this third preferred embodiment, a completely flexible ordering of ULT/DLT of any mode suitable for the applications and capabilities of the devices is possible.

The multiple mode PSMP frames may be separated by PIFS or other time duration, such as RIFS (Reduced Inter Frame Spacing), as determined based on other system factors.

The present invention may be implemented as a network having an access point with multiple STAs or WTRUs, at the data link layer, medium access control, and network layer, as an application specific integrated circuit (ASIC), digital signal processor (DSP) or software. The present invention relates to 802.11 based WLAN systems or OFDM/MIMO using radio resource management (RRM) and a radio resource controller (RRC).

Although the features and elements of the present invention are described in the preferred embodiments in particular combinations, each feature or element can be used alone without the other features and elements of the preferred embodiments or in various combinations with or without other features and elements of the present invention. The methods provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a station (STA), wireless transmit receive unit (WTRU), user equipment (UE), terminal, base station, radio network controller (RNC), or any host computer. The STA may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for use in an access point (AP), the method comprising:
   transmitting packet data to a station (STA) during a transmission opportunity (TXOP); and
   transmitting, on a condition that the AP does not have further packet data to transmit, an indication of truncation of the TXOP including a space-time block code (STBC) contention free (CF)-End frame and a non-STBC CF-End frame.

2. The method of claim 1, wherein the transmitting the indication of truncation of the TXOP occurs on a condition that sufficient TXOP duration is remaining.

3. The method of claim 2, wherein the remaining TXOP duration is sufficient on a condition that the remaining TXOP duration is greater than a sum of a CF-End frame duration, an STBC CF-End frame duration, a non-STBC CF-End frame duration, and two short interframe spacing (SIFS) durations.

4. The method of claim 1, wherein the indication of truncation of the TXOP indicates a network allocation vector (NAV) reset to a STA.

5. The method of claim 1, wherein each of the STBC CF-End frame and the non-STBC CF-End frame indicate an end of a contention free interval.

6. The method of claim 1, wherein a short interframe spacing (SIFS) duration separates the STBC CF-End frame and the non-STBC CF-End frame.

7. The method of claim 1, wherein the transmitting an indication of truncation of the TXOP includes transmitting a CF-End frame using a same modulation type as the transmitted packet data.

8. An access point (AP) comprising:
   a transmitter configured to transmit packet data to a station (STA) during a transmission opportunity (TXOP), wherein the transmitter is further configured to transmit, on a condition that the AP does not have further packet data to transmit, an indication of truncation of the TXOP including a space-time block code (STBC) contention free (CF)-End frame and a non-STBC CF-End frame.

9. The AP of claim 8, wherein the transmitter is further configured to transmit the indication of truncation of the TXOP on a condition that sufficient TXOP duration is remaining.

10. The AP of claim 9, wherein sufficient TXOP duration is remaining on a condition that a remaining TXOP duration is greater than a CF-End frame duration, an STBC CF-End frame duration, a non-STBC CF-End frame duration, and two short interframe spacing (SIFS) durations.

11. The AP of claim 8, wherein the transmitter is further configured to transmit an indication of truncation of the TXOP using a CF-End frame using a same modulation type as the transmitted packet data.

12. The AP of claim 8, wherein the indication of truncation of the TXOP indicates a network allocation vector (NAV) reset to a station (STA).

13. The AP of claim 8, wherein each of the STBC CF-End frame and the non-STBC CF-End frame indicate an end of a contention free interval.

14. The AP of claim 8, wherein the transmitter is configured to transmit the STBC CF-End frame and the non-STBC CF-End frame separated by a short interframe spacing (SIFS) duration.

15. A method for use in a station (STA), the method comprising:
   receiving packet data from an access point (AP) during a transmission opportunity (TXOP) held by the AP; and
   receiving a space-time block code (STBC) CF-End frame that indicates truncation of the TXOP held by the AP and receiving a non-STBC CF-End frame that indicates truncation of the TXOP held by the AP.

16. The method of claim 15, wherein a short interframe spacing (SIFS) duration separates the STBC CF-End frame and the non-STBC CF-End frame.

17. The method of claim 16, wherein one of the STBC CF-End frame and the non-STBC CF-End frame is in a same modulation type as the received packet data.

18. The method of claim 15, further comprising:
   resetting a network allocation vector (NAV) of the STA based on receiving the STBC CF-End frame and the non-STBC CF-End frame.

19. A station (STA) comprising:
   a receiver configured to receive packet data from an access point (AP) during a transmission opportunity (TXOP) held by the AP, wherein the receiver is further configured to receive a space-time block code (STBC) CF-End frame that indicates truncation of the TXOP held by the AP and a non-STBC CF-End frame that indicates truncation of the TXOP held by the AP.

20. The STA of claim 19, wherein the receiver is further configured to receive the STBC CF-End frame and the non-STBC CF-End frame separated by a short interframe spacing (SIFS) duration.

21. The STA of claim 20, wherein the receiver is further configured to receive one of the STBC CF-End frame and the non-STBC CF-End frame in a same modulation type as the received packet data.

22. The STA of claim 19 further comprising:
   a processor configured to reset a network allocation vector (NAV) of the STA based on receiving the STBC CF-End frame and the non-STBC CF-End frame.

* * * * *